United States Patent
Fitch et al.

(10) Patent No.: US 11,047,758 B1
(45) Date of Patent: Jun. 29, 2021

(54) PRESSURE INDICATOR FOR A STATIC STORAGE CONTAINER

(71) Applicant: Luneta, LLC, Tulsa, OK (US)

(72) Inventors: James Chester Fitch, Tulsa, OK (US); Thomas Chester Fitch, Tulsa, OK (US)

(73) Assignee: Luneta, LLC, Tulsa, OK (US)

( * ) Notice: Subject to any disclaimer, the term of this patent is extended or adjusted under 35 U.S.C. 154(b) by 0 days.

(21) Appl. No.: 16/555,202

(22) Filed: Aug. 29, 2019

Related U.S. Application Data (62) Division of application No. 14/689,743, filed on Apr. 17, 2015, now abandoned.

(60) Provisional application No. 61/981,570, filed on Apr. 18, 2014.

(51) Int. Cl.
| | |
|---|---|
| *G01L 19/10* | (2006.01) |
| *B65B 3/26* | (2006.01) |
| *B65D 88/06* | (2006.01) |
| *B65B 1/30* | (2006.01) |
| *B65D 90/48* | (2006.01) |

(52) U.S. Cl.
CPC ............... *G01L 19/10* (2013.01); *B65B 1/30* (2013.01); *B65B 3/26* (2013.01); *B65D 88/06* (2013.01); *B65D 90/48* (2013.01)

(58) Field of Classification Search
CPC ........................................................ G01L 19/10
USPC ................................................. 73/23.27, 715
See application file for complete search history.

(56) References Cited

U.S. PATENT DOCUMENTS

| | | | | |
|---|---|---|---|---|
| 2,050,113 | A | * | 8/1936 | Miner, Jr. ............... G01L 19/08 340/626 |
| 2,333,188 | A | * | 11/1943 | Loughin ............... G01F 23/161 116/272 |
| 2,454,264 | A | * | 11/1948 | Stigter ................. G01L 23/10 310/338 |
| 3,256,740 | A | * | 6/1966 | Tate .................. G05D 16/0619 73/701 |
| 3,280,632 | A | | 10/1966 | Harland |
| 3,506,286 | A | * | 4/1970 | Defauw ................ B65D 47/10 285/203 |
| 3,675,722 | A | * | 7/1972 | Balmes, Sr. .......... A62C 37/50 169/30 |
| 3,703,879 | A | * | 11/1972 | Huthsing, Jr. .......... G01L 7/086 116/270 |

(Continued)

*Primary Examiner* — John Fitzgerald
*Assistant Examiner* — Rodney T Frank
(74) *Attorney, Agent, or Firm* — Dunlap Codding, P.C.

(57) ABSTRACT

A pressure indicator is disclosed having a coupling body and an indicator member positioned within the coupling body. The coupling body has an open first end and an open second end, an inside surface and an outside surface extending from the open first end to the open second end. The inside surface surrounds a coupling body cavity. The outside surface is threaded adjacent to the second end. The coupling body is sized and dimensioned to be threaded into a bung hole of a static storage container. The indicator member is positioned within the coupling body cavity in a sealing relationship. The indicator member, biased to a first position, is movable from the first position within the coupling body cavity to a second position outside of the coupling body cavity responsive to the coupling body being exposed to a pressure within the static storage container above a predetermined pressure threshold.

16 Claims, 4 Drawing Sheets

(56) References Cited

U.S. PATENT DOCUMENTS

| | | | | |
|---|---|---|---|---|
| 3,742,898 A | * | 7/1973 | Souza | B65D 39/04 |
| | | | | 116/268 |
| 3,851,796 A | | 12/1974 | Moos | |
| 3,901,083 A | * | 8/1975 | Wallace | G01L 7/18 |
| | | | | 73/715 |
| 3,910,222 A | * | 10/1975 | Metivier | A61M 16/0051 |
| | | | | 116/70 |
| 4,082,056 A | * | 4/1978 | German | B60C 23/02 |
| | | | | 116/272 |
| 4,343,188 A | * | 8/1982 | Baker | G01L 7/18 |
| | | | | 73/706 |
| 4,620,500 A | * | 11/1986 | Condon | G01L 19/12 |
| | | | | 116/215 |
| 4,654,643 A | * | 3/1987 | Meisenheimer, Jr. | |
| | | | | G01L 19/12 |
| | | | | 116/266 |
| 5,709,313 A | * | 1/1998 | Richoux | B65D 39/088 |
| | | | | 220/601 |
| 6,182,514 B1 | * | 2/2001 | Hodges | G01L 9/0036 |
| | | | | 73/722 |
| 6,227,055 B1 | * | 5/2001 | Pitzer | G01L 19/0061 |
| | | | | 73/715 |
| 6,339,960 B1 | * | 1/2002 | Costley | G01F 22/02 |
| | | | | 73/52 |
| 6,474,169 B1 | * | 11/2002 | Aizawa | G01L 19/0627 |
| | | | | 73/715 |
| 2008/0105682 A1 | | 5/2008 | Goddard | |
| 2012/0216621 A1 | * | 8/2012 | Oto | G01L 9/008 |
| | | | | 73/715 |

* cited by examiner

PRESSURE INDICATOR FOR A STATIC STORAGE CONTAINER

CROSS REFERENCE/INCORPORATION BY REFERENCE

The present application is a divisional of U.S. patent application Ser. No. 14/689,743 filed Apr. 17, 2015, which claims priority of U.S. Provisional Patent Application No. 61/981,570, filed on Apr. 18, 2014. The entire contents of the patent applications referenced above are hereby incorporated by reference herein in their entireties.

BACKGROUND

A drum is a cylindrical container used for shipping bulk cargo. Drums can be made of steel, dense paperboard (commonly called a fiber drum), or plastics, and are generally used for the transportation and static storage of liquids and powders. The construction of a drum needs to meet applicable regulations and is usually matched for compatibility with the specific product shipped.

It is common to hear a drum referred to as a barrel and the two terms are used nearly interchangeably. Many drums have a common nominal volume of 208 litres (55 US gal; 46 imp gal) and nominally measure just under 880 millimetres (35 in) tall with a diameter just under 610 millimetres (24 in) and differ by holding about thirteen gallons more than a Barrel of Crude Oil. In the US, 25-US-gallon (95 l; 21 imp gal) drums are also in common use and have the same height. This allows easy stacking of pallets supporting drums of different volumes.

The two common sub-types of drums are the open top and the welded top (normally with a 2-inch (51 mm) bung hole and a ¾ inch (19.05 mm) vent hole). The welded top drum is normally referred to as a 'barrel' in the United States. The welded top drum cannot efficaciously either dispense or be filled with powdered goods, though they might store them very well, so the welded top drum is not used for such goods, being reserved for liquids transport and storage. Plastic drums are manufactured using injection blow moulding technology and have either a separate lid (similar to those on fiber drums) or a welded type top with the bung hole and vent hole molded in. Metal drums are manufactured with steel hot-rolled into long pipe-like sections then forged on a stamping press while still red-hot into drum bodies. A welded rolled seam is then made for the drum bottom, or both of the bottom and the top.

Some drums have reinforcing rings of thickened metal or plastic at four places: top, bottom, and one each a third of the way from each end ring. The reinforcing rings sufficiently strengthen the drums so that they can readily be turned on their sides and rolled when filled with heavy materials, like liquids. Over short to medium distances, drums can be tipped and rolled on the bottom rim while being held at an angle, balanced, and rotated with a two-handed top grip that also supplies the torque (rotational or rolling force).

The open-top sub-type is sealed by a mechanical ring clamp (concave inwards) that exerts sufficient pressure to hold many non-volatile liquids and make an airtight seal against a gasket, as it exerts force inward and downward when tightened by a normal three-quarter inch wrench or ratchet wrench. Tops exist for the open-top sub-type of drum with bung and vent holes as above, and these hybrid drums with lid can be used to ship many non-volatile liquids as well as industrial powders. Many drums are used to ship and store powdered products as well as liquids, such as plastic beads for injection moulding, extrusion, and purified industrial grade powders like cleansers (e.g., fertilizers, and powdered aluminum).

The welded-top or hybrid drums have two openings surrounded by threaded flanges (2" diameter bung hole, and a ¾" diameter vent). Once the drums are filled, plugs known in the art as "bungs" are screwed into the openings and secured by the flanges using pneumatic or hand operated bung tighteners, which may also be known as a "plug wrench." To remove the materials within the drums, the bungs within the bung hole and the vent are removed and then the material is poured and/or pumped through the bung hole.

A problem known as particulate contamination exists with respect to the static storage of materials, such as oil or other machine fluids, within a drum. Particulate contamination is caused by unwanted entry of particulates into the drum thereby contaminating the material stored within the drum. Common particulates include water and dirt.

Normal recommendations for avoiding particulate contamination include (1) not storing the drums outside indefinitely because steel drums can rust and contaminate material stored in the drum; (2) making sure that the bungs are tightened and that the drum seams and seals around the bungs are in good condition; (3) keeping drums as dry as possible and away from water; and (4) storing drums in a location that avoids extreme temperature variations because temperature variations cause pressure variations within the drum and can cause unwanted particulates to be drawn into the drum.

It has been found, however, that particulate contamination may still occur even when the normal recommendations are followed. Further, it may not be feasible in all instances to follow the normal recommendations such as when insufficient resources and/or buildings exist to keep the drums as dry as possible and/or avoid extreme temperature variations. It would be desirable to be able to prevent or reduce particulate contamination even when the normal recommendations are not followed. It is to such an improved storage assembly that the present disclosure is directed.

SUMMARY

The present disclosure is directed to a storage assembly including a storage pressure indicator assembly for use with a static storage container, such as a drum, that prevents or substantially reduces the occurrence of particulate contamination of material stored within the static storage container.

In some embodiments, a storage assembly is disclosed as having a static storage container, a storage material positioned within the static storage container, and a storage pressure indicator assembly mechanically connected to the static storage container. The static storage container may have a housing with an interior surface encompassing a storage space, and an external surface. The housing may have at least one opening extending from the interior surface to the external surface. The storage material may be positioned within the storage space. The storage pressure indicator assembly may be mechanically connected to the housing so as to selectively isolate the storage space from an external environment. The storage pressure indicator assembly may include a pressure indicator positioned within the at least one opening and a valve supported by the static storage container. The pressure indicator may read a pressure within the housing and communicate to a user when the pressure within the housing exceeds a predetermined pressure threshold above a pressure of the external environment while substantially maintaining the pressure within the housing. The valve may communicate with the pressure indicator via the storage space. The valve may have a first position in which the valve receives a medium from a source external to the housing and supplies the medium into the storage space to raise the pressure within the housing above the predetermined pressure threshold and independent of a quantity of the storage material within the storage space. The valve may have a second position in which the value isolates the storage space from the external environment. In some embodiments, the pressure indicator is placed on the top of the static storage container so that the pressure indicator is highly visible to the user. In these embodiments, the user may look over many of the static storage containers having the storage pressure indicator assembly and quickly discern which of the static storage containers have sufficient pressure.

In another version, a pressure indicator is disclosed having a coupling body and an indicator member positioned within the coupling body. The coupling body may have an open first end and an open second end, an inside surface and an outside surface extending from the open first end to the open second end. The inside surface may surround a coupling body cavity. The outside surface may be threaded adjacent to the second end. The coupling body may be sized and dimensioned to be threaded into an internally threaded bung hole of a static storage container. The indicator member may be positioned within the coupling body cavity in a sealing relationship with the inside surface of the coupling body. The indicator member may be movable from a first position within the coupling body cavity to a second position outside of the coupling body cavity responsive to the open second end of the coupling body being exposed to a pressure within the static storage container above a predetermined pressure threshold. The indicator member may be biased to the first position.

In another embodiment, a storage airlock kit is disclosed. The storage airlock kit may be for a static storage container having a housing with an interior surface encompassing a storage space, and an external surface. The housing may have at least two openings extending from the interior surface to the external surface. The static storage container may have a storage material positioned within the storage space. The storage airlock kit may include a pressure indicator, a pressure manipulation assembly, and a container encompassing the pressure indicator and the pressure manipulation assembly.

The pressure indicator may have a first coupling body and an indicator positioned within the first coupling body. The first coupling body may have an open first end and an open second end, an inside surface and an outside surface extending from the open first end to the open second end. The inside surface may surround a first coupling body cavity. The outside surface may be threaded adjacent to the second end. The first coupling body may be sized and dimensioned to be threaded into a first opening of the at least two openings of a static storage container. The indicator member may be positioned within the first coupling body cavity in a sealing relationship with the inside surface of the first coupling body. The indicator member may be movable from a first position within the first coupling body cavity to a second position outside of the first coupling body cavity responsive to the open second end of the first coupling body being exposed to a pressure within the static storage container above a predetermined pressure threshold. The indicator member being biased to the first position.

The pressure manipulation assembly may have a second coupling body and a valve supported by the second coupling body. The second coupling body may have an open first end and an open second end, an inside surface and an outside surface extending from the open first end to the open second end. The inside surface may surround a second coupling body cavity. The outside surface may be threaded adjacent to the open second end. The second coupling body may be sized and dimensioned to be threaded into a second opening of the at least two openings of the static storage container. The valve may communicate with the pressure indicator via the storage space. The valve may have a first position in which the valve receives a medium from a source external to the housing and supplies the medium into the storage space to raise the pressure within the static storage container above the predetermined pressure threshold and independent of a quantity of the storage material within the storage space. The valve may also have a second position in which the valve isolates the storage space from a pressure of an external environment.

In another embodiment, a method is disclosed. The method may be performed by adding a storage material to a static storage container having at least one opening. A medium is added to the static storage container until a pressure indicator connected to the at least one opening of the static storage container indicates that a predetermined pressure threshold above atmospheric pressure has been reached. The method may further be performed by determining a pressure within the static storage container is above the predetermined pressure threshold based on the pressure indicator.

BRIEF DESCRIPTION OF THE DRAWINGS

Certain embodiments of the inventive concepts will hereafter be described with reference to the accompanying drawings, wherein like reference numerals denote like elements. It should be understood, however, that the accompanying figures illustrate the various implementations described herein and are not meant to limit the scope of the various technologies described herein.

DETAILED DESCRIPTION

Specific embodiments of the inventive concepts disclosed herein will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited or inherently present therein.

As used herein any references to "one embodiment," "an embodiment," or "some embodiments" means that a particular element, feature, structure, or characteristic described in connection with the embodiment is included in at least one embodiment. The appearances of the phrase "in one embodiment" in various places in the specification may not refer to the same embodiment.

Figure 1:
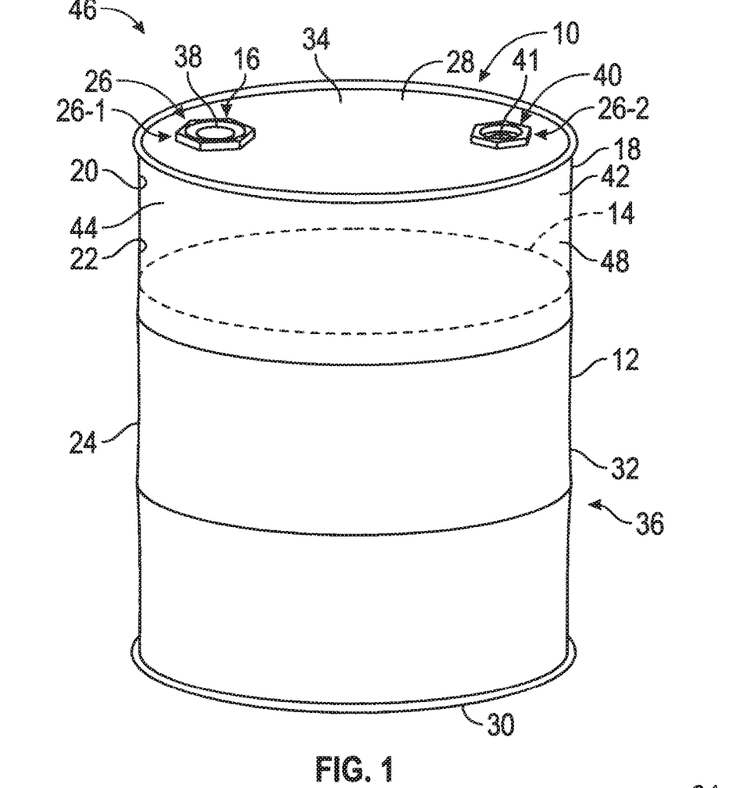
FIG. 1 is a perspective view of a storage assembly, in accordance with some embodiments of the present disclosure.
Figure 2:
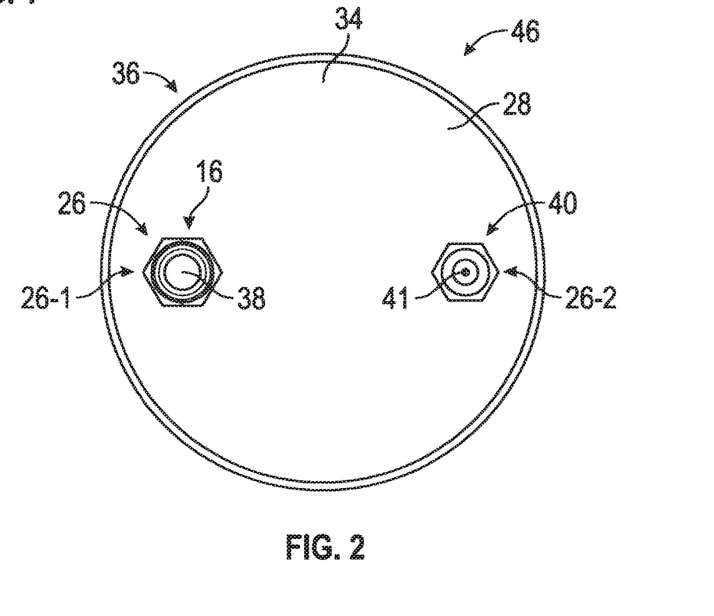
FIG. 2 is a top plan view of the storage assembly of FIG. 1.

Referring now to FIGS. 1 and 2, therein shown is a storage assembly 10 in accordance with some embodiments of the present disclosure. The storage assembly 10 may include a static storage container 12, a storage material 14 positioned within the static storage container 12, and a storage pressure indicator assembly 16 mechanically connected to the static storage container 12. The static storage container 12 may have a housing 18 with an interior surface 20 encompassing a storage space 22, and an external surface 24. The housing 18 may have at least one opening 26 extending from the interior surface 20 to the external surface 24. The storage material 14 may thereby be positioned within the storage space 22 of the static storage container 12 through the at least one opening 26. In some embodiments, the static storage container 12 may have a first end 28, a second end 30 opposite the first end 28, and a sidewall 32 extending between the first end 28 and the second end 30. The storage material 14 may be a liquid, such as lubricants, oil, fuel, or other liquids suitable for storage in the static storage container 12, or solids which benefit from storage within the static storage container 12 at a pressure above an ambient pressure of an environment surrounding the static storage container 12.

The static storage container 12 may be implemented as a drum, such as those formed from steel, dense paperboard (fiber drums), or plastics. For example, the static storage container 12 may be an open top or welded top drum, or any other suitable static storage container. In these embodiments, the sidewall 32, the housing 18, and the storage space 22 may be formed from steel, dense paperboard, plastics, or other suitable materials. In some embodiments the static storage container 12 may be constructed to meet safety regulations and be implemented such that a material forming the static storage container 12 may be matched for compatibility with the storage material 14 stored within the storage space 22 of the static storage container 12. In some embodiments, the storage space 22 may be lined with a material which enables the storage space 22 to be compatible with the storage material 14 where the material forming the static storage container 12 would otherwise be incompatible with the storage material 14. In these embodiments, the interior surface 20 may be formed from a material differing from that of the housing 18, the sidewall 32, or the external surface 24.

In some embodiments, the at least one opening 26 may be formed in the first end 28 of the static storage container 12. Where the static storage container 12 is an open top design, the at least one opening 26 may be formed in a lid 34 secured proximate to the first end 28 of the static storage container 12. In some embodiments with a single opening 26, the at least one opening 26 may be either a bung hole, such as the common two inch (51 mm) bung hole, or a vent hole, such as the common ¾ inch (19.05 mm) vent hole. In embodiments with two or more openings, a first opening 26-1 may be a bung hole, as described above, and a second opening 26-2 may be a vent hole, as described above. In some other embodiments, the at least one opening 26 may be implemented as at least two bung holes.

The at least one opening 26 may be configured to mechanically connect the storage pressure indicator assembly 16 to the static storage container 12. For example, in some embodiments, the at least one opening 26 may be an internally threaded opening, such as an internally threaded bung hole. In some embodiments, the at least one opening 26 may be externally threaded or have a fitting connected thereto to form an external or internal threading to the at least one opening 26. In some other embodiments, the at least one opening 26 may be configured to connect the storage pressure indicator assembly 16 to the static storage container 12 via mechanical connections such as clamps, fittings, bolts, brazing, welding, or other mechanical connection mechanisms.

The storage pressure indicator assembly 16 may be mechanically connected to the housing 18, for example at the at least one opening 26, so as to selectively isolate the storage space 22 from an external environment 36. The storage pressure indicator assembly 16 may include a pressure indicator 38 positioned within the at least one opening 26 and a pressure manipulation assembly 40 supported by the static storage container 12. The pressure indicator 38 may read a pressure 42 within the housing 18 and communicate to a user when the pressure 42 within the housing 18 exceeds a predetermined pressure threshold 44 above a pressure 46 of the external environment 36 while substantially maintaining the pressure 42 within the housing 18.

The pressure manipulation assembly 40 may include a valve 41 which may communicate with the pressure indicator 38 via the storage space 22. The valve 41 may have a first position, shown in FIG. 6, in which the valve 41 receives a medium 48 from a source (not shown) external to the housing 18. The valve 41, in the first position, may supply the medium 48 into the storage space 22 to raise the pressure 42 within the housing 18 above the predetermined pressure threshold 44. The pressure 42 within the housing 18 may be raised independent of a quantity of the storage material 14 within the storage space 22. The valve 41 may also have a second position, shown in FIG. 6, in which the valve 41 may isolate the storage space 22 from the external environment 36.

The predetermined pressure threshold 44 may be a minimum predetermined pressure above atmospheric pressure, for example where the pressure 46 of the external environment 36 is at atmospheric pressure. In some embodiments, the predetermined pressure threshold 44 may be a first predetermined pressure threshold 44-1 above atmospheric pressure. A second predetermined pressure threshold 44-2 may be a pressure, greater than the first predetermined pressure threshold 44-1, above which the valve 41 releases the pressure 42 within the housing 18, such that the pressure 42 within the housing 18 may be maintained between the first predetermined pressure threshold 44-1 and the second predetermined pressure threshold 44-2.

In some embodiments, the storage assembly 10 may be constructed by forming or otherwise obtaining the static storage container 12. The storage pressure indicator assembly 16 may be connected to the static storage container 12. For example, in some embodiments, the pressure indicator 38 of the storage pressure indicator assembly 16 may be mechanically connected to the first opening 26-1 and the pressure manipulation assembly 40 may be mechanically connected to the second opening 26-2. The pressure indicator 38 and the pressure manipulation assembly 41 may be mechanically connected to the first and second openings 26-1 and 26-2, respectively, by cooperating threading, clamps, or any other suitable mechanism.

Figure 3:
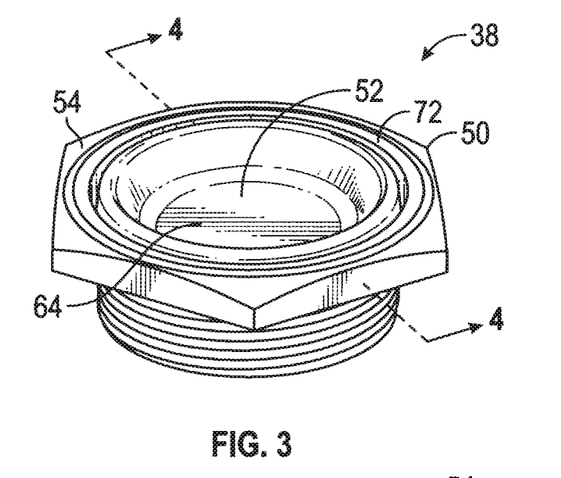
FIG. 3 is a perspective view of a pressure indicator, in accordance with some embodiments of the present disclosure.
Figure 4:
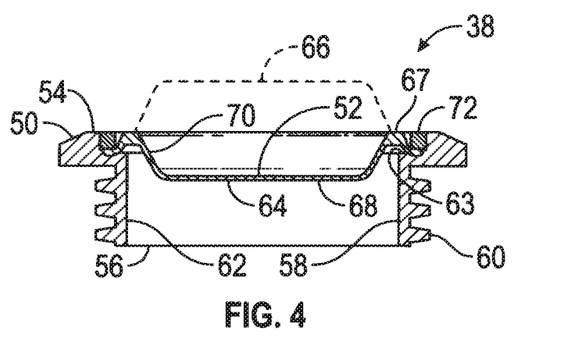
FIG. 4 is a cross sectional view of the pressure indicator of FIG. 3 taken along line 4-4.

Referring now to FIGS. 3 and 4, therein shown is the pressure indicator 38, in accordance with some embodiments of the present disclosure. The pressure indicator 38 may include a first coupling body 50 and an indicator member 52 positioned within the first coupling body 50. The first coupling body 50 may have an open first end 54 and an open second end 56, an inside surface 58 and an outside surface 60 extending from the open first end 54 to the open second end 56. The inside surface 58 may surround a coupling body cavity 62. In some embodiments, the outside surface 60 may be threaded adjacent to the second end 56. The first coupling body 50 may be sized and dimensioned to be threaded into the first opening 26-1 of the at least one opening 26 of the static storage container 12. In some embodiments, the outside surface 60 may be dimensioned proximate to the open first end 54 to cooperate with a tool, such as an open ended wrench, strap wrench, hand, or other mechanical tightening device to secure the coupling body 50 into the at least one opening 26. For example, a portion of the outside surface 60, proximate to the open first end 54 may define a hexagonal shape, an octagonal shape, a circular shape, or any other suitable shape.

In some embodiments, the first coupling body 50 may define a shoulder 63 extending circumferentially around the first coupling body 50 and forming a part of the inside surface 58 adjacent to the open first end 54. It should be understood that although shown in some embodiments as a single coupling body 50, the coupling body 50 may be implemented as a single device or multiple devices connected together. For example, the coupling body 50 may be formed as a first portion, interacting with the indicator member 52, and a second portion, connected to the first portion, for connecting the coupling body 50 with the static storage container 12. In these embodiments, for example, the second portion of the coupling body 50, configured to cooperate with the one or more opening 26 of the static storage container 12, may be interchangeable so as to enable the coupling body 50 to connect to openings in the static storage container 12 having differing sizes, dimensions, or connection mechanisms.

The first coupling body 50 may be formed from metals, such as steel, aluminium, or any other suitable metal; plastics, such as polyethylene, polyethylene terephthalate, high-density polyethylene, polypropylene, or any other suitable plastic; or any other material suitable to be mechanically connected to the at least one opening 26 and to support the indicator member 52.

The indicator member 52 may be positioned within the coupling body cavity 62 in a sealing relationship with the inside surface 58 of the first coupling body 50. The indicator member 52 may be movable from a first position 64 within the coupling body cavity 62 to a second position 66 outside of the coupling body cavity 62 responsive to the open second end 56 of the first coupling body 50 being exposed to the pressure 42 within the housing 18 of the static storage container 12 above the predetermined pressure threshold 44. The indicator member 52 may be biased to the first position 64.

In some embodiments, as shown in FIGS. 3 and 4, the indicator member 52 may be an indicator diaphragm 52 spanning the coupling body cavity 62 and supported by the shoulder 63. In embodiments where implemented as the indicator diaphragm 52, the indicator member 52 may be formed form an elastomeric material, such as silicon, rubber, or other suitable elastomeric materials. In some other embodiments, the indicator diaphragm 52 may be formed from other flexible materials such as a metal or a plastic, for example. The indicator diaphragm 52 may include a rim 67, an indicator body 68, and a wall 70 connecting the rim 67 to the indicator body 68. The wall 70 may surround the indicator body 68 and the rim 67 may surround the wall 70. The rim 67 may be positioned on the shoulder 63 when the indicator diaphragm 52 is connected to the first coupling body 50. The indicator body 68 of the indicator diaphragm 52 may be movable from the first position 64 within the coupling body cavity 62 to the second position 66 outside of the coupling body cavity 62 responsive to the open second end 56 of the first coupling body 50 being exposed to the pressure within the housing 18 of the static storage container 12 above the predetermined pressure threshold 44. The indicator body 68 may be biased to the first position 64 by the wall 70.

The pressure indicator 38, in some embodiments, may further include a ring 72. The ring 72 may be positioned proximate to the open first end 54 of the first coupling body 50 and may mechanically connect the indicator diaphragm 52 to the first coupling body 50. The ring 72 may be formed from plastic, steel, aluminium, or other suitable material capable of being configured to mechanically connect the indicator diaphragm 52 and the first coupling body 50.

In some embodiments, the pressure indicator 38 may be an electronic indicator member 52 capable of transmitting a wireless signal indicative of the pressure 42 within the housing 18 of the storage space 22 relative to the predetermined pressure threshold 44 to a user device. For example, the electronic indicator member 52 may be implemented as a pressure sensor in conjunction with a transceiver device capable of transmitting the wireless signal to the user device, such as a blue tooth transmitter, a radio transmitter, a Wi-Fi transmitter, or any other suitable communications device.

The user device may be implemented as a computer, a PDA, a smartphone, a laptop, a tablet, an e-reader, or any other suitable user device capable of receiving the wireless signal from the electronic indicator member 52. In some other embodiments, the electronic indicator member 52 may include a light or speaker operably connected to the pressure sensor. In these embodiments, when the pressure 42 falls below the predetermined pressure threshold 44, the light or speaker may activate, thereby generating an indication that the pressure is below the predetermined pressure threshold 44. A camera, or other light or sound sensitive device, acting in cooperation with the electronic indicator member 52 may register the activation of the light or speaker and cause the indication from the electronic indicator member 52 to be transmitted to the user device.

In some embodiments, the pressure indicator 38 may be constructed by obtaining the first coupling body 50 and placing the indicator diaphragm 52 into the first coupling body cavity 62, such that the rim 67 contacts the shoulder 63. The ring 72 may be positioned against the rim 67 within the first coupling body cavity 62 so as to secure the indicator diaphragm 52 inside the first coupling body cavity 62. The first coupling body 50 may be formed by casting, 3D printing, machining, or any other process suitable for the material forming the first coupling body 50. The indicator diaphragm 52 may be formed by moulding, 3D printing, injection moulding, machining, or any other suitable process suitable for the material forming the indicator diaphragm 52.

In some embodiments, the pressure indicator 38 may include a pressure sensor, control circuitry, a solenoid having a source of motive force (e.g., battery), a coil, and a piston. The source of motive force may be coupled to the coil and the coil may surround the piston. The piston may be movable, by the source of motive force and the coil between the first position 64 and the second position 66 to provide a user with an indication of the pressure 42 within the storage space 22.

In some other embodiments, the pressure indicator 38 may include a piston and a spring. The spring may be connected to the coupling body 50 and the piston. The spring may serve to bias the piston to the first position. The pressure 42 within the housing 18, when above the predetermined pressure threshold 44, may cause the piston of the pressure indicator 38 to move to the second position 66, against a force of the spring.

Figure 5:
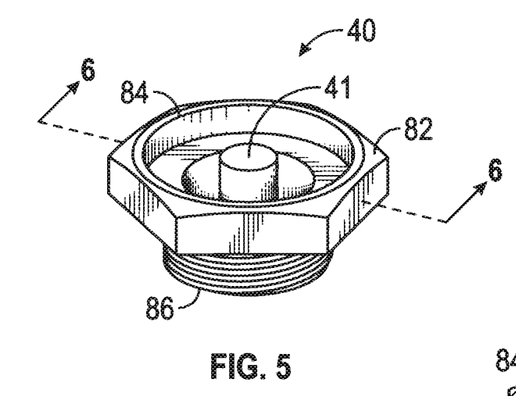
FIG. 5 is a perspective view of a pressure manipulation assembly, in accordance with some embodiments of the present disclosure.
Figure 6:
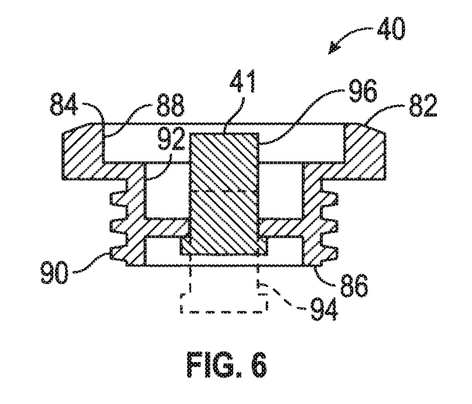
FIG. 6 is a cross sectional view of the pressure manipulation assembly of FIG. 5 taken along line 6-6.

Referring now to FIGS. 5 and 6, therein shown is the pressure manipulation assembly 40, in accordance with some embodiments of the present disclosure. The pressure manipulation assembly 40 may include a second coupling body 82 and the valve 41 supported by the second coupling body 82. The second coupling body 82 may have an open first end 84 and an open second end 86, an inside surface 88 and an outside surface 90 extending from the open first end 84 to the open second end 86. The inside surface 88 may surround a second coupling body cavity 92. At least a portion of the outside surface 90 may be threaded adjacent to the open second end 86. In at least some embodiments, the second coupling body 82 may be sized and dimensioned to be threaded into the second opening 26-2 of the at least one opening 26, where the static storage container 12 is implemented with at least two openings 26.

In some embodiments, the outside surface 90 may be dimensioned proximate to the open first end 84 to cooperate with a tool, such as an open-ended wrench, strap wrench, hand, or other mechanical tightening device to secure the second coupling body 82 into the second opening 26-2. For example, a portion of the outside surface 90, proximate to the open first end 84 may define a hexagonal shape, an octagonal shape, a circular shape, or any other suitable shape. The second coupling body 82 may be formed from metals, such as steel, aluminium, or any other suitable metal; plastics, such as polyethylene, polyethylene terephthalate, high-density polyethylene, polypropylene, or any other suitable plastic; or any other material suitable to be mechanically connected to the second opening 26-2 and to support the valve 41.

It should be understood that although shown in some embodiments as a single coupling body 82, the second coupling body 82 may be implemented as a single device or multiple devices connected together. For example, the second coupling body 82 may be formed as a first portion, supporting the valve 41, and a second portion, connected to the first portion, for connecting the second coupling body 82 with the static storage container 12. In these embodiments, for example, the second portion of the second coupling body 82, configured to cooperate with the second opening 26-2 of the static storage container 12, may be interchangeable so as to enable the second coupling body 82 to connect to openings in the static storage container 12 having differing sizes, dimensions, or connection mechanisms.

The valve 41 may be supported by the second coupling body 82 and communicate with the pressure indicator 38 via the storage space 22. The valve 41 may have a first position 94 in which the valve 41 receives the medium 48 into the storage space 22 to raise the pressure 42 within the static storage container 12 above the predetermined pressure threshold 44. The pressure 42 may be raised independent of a quantity of the storage material 14 within the storage space 22. The valve 41 may also have a second position 96 in which the valve 41 isolates the storage space 22 from the pressure 46 of the external environment 36. In some embodiments, the valve 41 may be implemented as a Schrader valve, a Presta valve, or any other suitable valve.

In some embodiments, the valve 41 may include a first valve and a second valve (not shown). The first valve may be configured to enable a pressure increase within the static storage container 12. The second valve may be configured to release the pressure within the housing 18 of the static storage container 12 above the second predetermined pressure threshold 44-2, where the second predetermined pressure threshold 44-2 is greater than the first predetermined pressure threshold 44-1.

In some embodiments, the pressure manipulation assembly 40 may be constructed by forming or otherwise obtaining the second coupling body 82, inserting the valve 41 (e.g., a valve stem) into the second coupling body cavity 92, and securing the valve 41 in the second coupling body cavity 92. For example, the valve stem of the valve 41 may be secured within the second coupling body cavity 92 by one or more springs or threads. In some embodiments, the second coupling body 82 may be formed by casting, 3D printing, machining, or any other process suitable for the material forming the second coupling body 82.

Referring now to FIGS. 7-10, therein shown is a storage pressure indicator assembly 100, in accordance with some embodiments of the present disclosure. The storage pressure indicator assembly 100, may be used with the static storage container 12, for example, where the static storage container 12 has only one opening 26. As another example, the storage pressure indicator assembly 100 may be used with the static storage container 12 in the first opening 26-1 where the second opening 26-2 is of insufficient size to accommodate the storage pressure indicator assembly 100 or the pressure manipulation assembly 40. The storage pressure indicator assembly 100 may include a coupling body 102 supporting a pressure indicator 104 and a valve 106. The coupling body 102 may be implemented similarly to the first coupling body 50 and the second coupling body 82, with the exception that an open first end 108 has at least a first opening 110 and a second opening 112. The pressure indicator 104, implemented similar to the pressure indicator 38 or the indicator diaphragm 52, may be positioned at least partially within the first opening 110. The valve 106, implemented similar to the valve 41, may be positioned at least partially within the second opening 112. The pressure indicator 104 may be movable between a first position 114 within the coupling body 102, shown in FIG. 7, and a second position 116 outside of the coupling body 102 responsive to the coupling body 102 being exposed to the pressure 42 within the static storage container 12 above the predetermined pressure threshold 44 or the first predetermined pressure threshold 44-1, shown in FIGS. 9 and 10.

Figure 7:
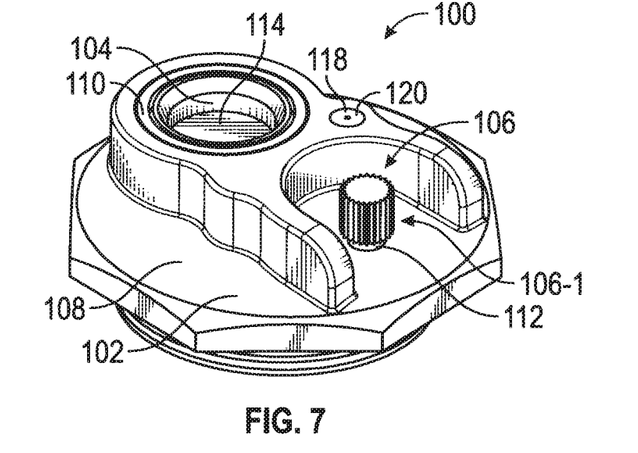
FIG. 7 is a perspective view of a storage pressure indicator assembly, in accordance with some embodiments of the present disclosure.
Figure 8:
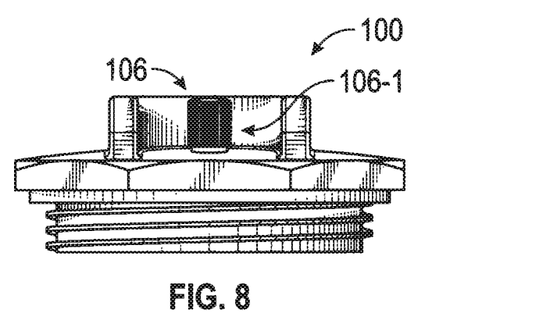
FIG. 8 is a side view of the storage pressure indicator assembly of FIG. 7.
Figure 9:
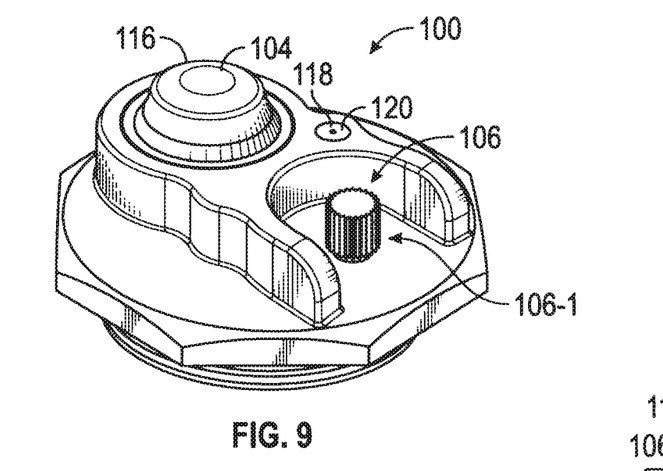
FIG. 9 is a perspective view of the storage pressure indicator assembly of FIG. 7 indicating a pressure above a predetermined pressure threshold.
Figure 10:
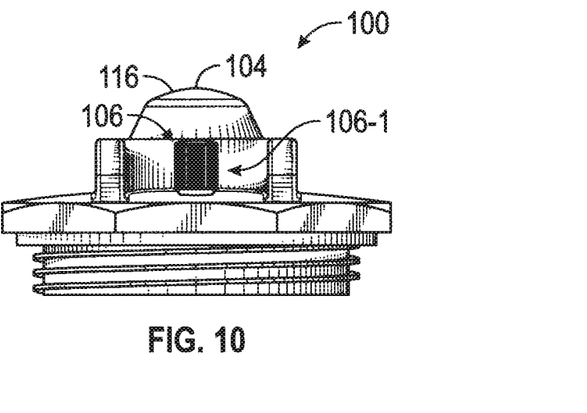
FIG. 10 is a side view of the storage pressure indicator assembly of FIG. 9.

In some embodiments, as shown in FIGS. 7 and 9, the storage pressure indicator assembly 100 may include a third opening 118 in the open first end 108 and a second valve 120 positioned at least partially within the third opening 114. In these embodiments, the valve 106 may be a first valve 106-1 configured to enable a pressure increase within the static storage container 12. The second valve 120 may be supported by the coupling body 102 and configured to release the pressure 42 within the static storage container 12 above the second predetermined pressure threshold 44-2, where the second predetermined pressure threshold 44-2 is greater than the first predetermined pressure threshold 44-1.

In some embodiments, the storage pressure indicator assembly 100 may be constructed by forming or otherwise obtaining the coupling body 102. The coupling body 102 may be formed by casting, 3D printing, machining, or any other process suitable for the material forming the coupling body 102. The pressure indicator 104 may be constructed by inserting an indicator member into the first opening 110 of the coupling body 102 such that a rim of the indicator member contacts a shoulder of the first opening 110 of the coupling body 102. A ring may be placed within the first opening 110 to connect the rim of the pressure indicator 104 to the shoulder of the coupling body 102. The ring may secure the pressure indicator 104 within the coupling body 102, similar to the pressure indicator 38 described above. The valve 106, or in some embodiments a valve stem of the valve 106, may be inserted into the second opening 112 and secured within the second opening 112. For example, the valve 106 or a valve stem of the valve 106 may be secured within the second opening 112 via one or more springs or threads. The second valve 120 may be inserted into the third opening 118 of the coupling body 102 and secured within the third opening 118. In some embodiments, the coupling body 102 may further be provided with a sealing ring 122 positioned proximate to an open second end 124 to form a sealing relationship between the coupling body 102 and the static storage container 12 when the coupling body 102 is inserted into the static storage container 12 in the at least one opening 26.

Figure 11:
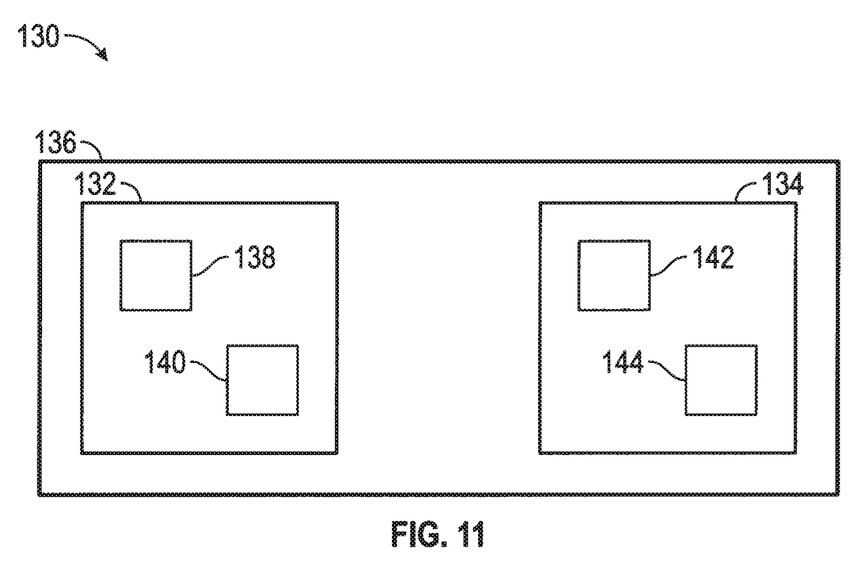
FIG. 11 is a diagrammatical view of a storage airlock kit, in accordance with some embodiments of the present disclosure.

Referring now to FIG. 11, shown therein is a diagrammatic representation of a kit 130 including a pressure indicator 132, a pressure manipulation assembly 134, and a container 136 encompassing the pressure indicator 132 and the pressure manipulation assembly 134. The pressure indicator 132 may have a first coupling body 138 and an indicator member 140. The pressure manipulation assembly 134 may have a second coupling body 142 and a valve 144. The first coupling body 138 may be implemented similarly to the first coupling body 50. The indicator member 140 may be implemented similarly to the indicator member 52. The second coupling body 142 may be implemented similarly to the second coupling body 82 and the valve 144 may be implemented similarly to the valve 41.

The container 136 may be implemented as a box, a bag, a moulded plastic, a blister pack, or any other suitable container capable of encompassing the pressure indicator 132 and the pressure manipulation assembly 134. In some embodiments, the container 136 may be constructed in a manner so as to support the pressure indicator 132 and the pressure manipulation assembly 134 in a packaging that may be at least partially transparent to light within the visible spectrum, for example.

The storage pressure indicator assembly 10, the pressure indicator 38, and the pressure manipulation assembly 40 may be used in a method. In some embodiments, the pressure indicator 38 may be connected to the at least one opening 26 of the static storage container 12, prior to or after the storage material 14 has been added to the static storage container 12. In some embodiments, the storage material 14 is added to the static storage container 12 through the at least one opening 26. The medium 48 may be added to the static storage container 12 until the pressure indicator 38, connected to the at least one opening 26 of the static storage container 12, indicates that the predetermined pressure threshold 44 above atmospheric pressure has been reached. The method may further be performed by determining the pressure 42 within the static storage container 12 is above the predetermined pressure threshold 44 based on the pressure indicator 38. Additional amounts of the medium 48 may be added to the static storage container 12 when the pressure indicator 38 indicates that the pressure 42 within the static storage container 12 is below the predetermined pressure threshold 44. As discussed above, the predetermined pressure threshold 44 may be the first predetermined pressure threshold 44-1 and the method may be further performed by releasing a portion of the medium 48 added to the static storage container 12 to maintain the pressure 42 within the static storage container 12 above the first predetermined pressure threshold 44-1 and below the second predetermined pressure threshold 44-2, where the second pressure threshold 44-2 is greater than the first predetermined pressure threshold 44-1.

Although the preceding description has been described herein with reference to particular means, materials and embodiments, it is not intended to be limited to the particulars disclosed herein; rather, it extends to functionally equivalent structures, methods, and uses, such as are within the scope of the appended claims.

What is claimed is:

1. A pressure indicator, comprising:
   a coupling body having a first end and a second end, an inside surface and an outside surface extending from the first end to the second end, the inside surface surrounding a first opening, and a second opening, the coupling body being sized and dimensioned to be inserted into a bung hole of a static storage container in a sealing relationship with the bung hole, the static storage container having a housing with an interior surface encompassing a storage space, the first opening and the second opening being positioned within the coupling body to be exposed to the storage space when the coupling body is inserted into the bung hole of the static storage container;
   an indicator member, separate from the coupling body, and positioned in a sealing relationship with the first opening of the coupling body, the indicator member having an indicator body being moveable from a first position to a second position responsive to the second end of the coupling body being exposed to a pressure within the static storage container above a predetermined pressure threshold, the indicator body of the indicator member being biased to the first position; and, a valve positioned within the second opening.

2. The pressure indicator of claim 1, wherein the indicator member is an indicator diaphragm formed of an elastomeric material, and spanning the first opening, the indicator diaphragm having a rim, an indicator body, and a wall connecting the rim to the indicator body, the indicator diaphragm being deformable such that the indicator body is movable from a first position to a second position responsive to the second end of the coupling body being exposed to a pressure within the static storage container above the predetermined pressure threshold, the indicator body of the indicator member being biased to the first position.

3. The pressure indicator of claim 1, wherein the coupling body further comprises a third opening, wherein the valve is a first valve, and further comprising a second valve within the third opening and mounted in the coupling body, the second valve configured to release pressure within the static storage container.

4. The pressure indicator of claim 2, wherein the coupling body defines a shoulder extending circumferentially around the coupling body and forming a part of the inside surface adjacent to the first end, and wherein the rim of the indicator diaphragm is supported by the shoulder.

5. The pressure indicator of claim 4, further comprising a ring positioned proximate to the first end of the coupling body and mechanically connecting the indicator diaphragm to the coupling body.

6. The pressure indicator of claim 1, wherein the predetermined pressure threshold is above atmospheric pressure.

7. A pressure indicator, comprising:
a coupling body having an open first end and an open second end, an inside surface and an outside surface extending from the open first end to the open second end, the inside surface surrounding a first opening and a second opening, the outside surface being threaded adjacent to the second end, the coupling body being sized and dimensioned to be threaded into an internally threaded bung hole of a static storage container;

an indicator member, separate from the coupling body, and positioned across the first opening and movable from a first position to a second position responsive to the open second end of the coupling body being exposed to a pressure within the static storage container above a predetermined pressure threshold, the indicator member being biased to the first position; and, a valve positioned within the second opening.

8. The pressure indicator of claim 7, wherein the static storage container is a plastic or metal drum having at least two bung holes.

9. The pressure indicator of claim 7, wherein the coupling body defines a shoulder extending circumferentially around the coupling body and forming a part of the inside surface adjacent to the first end, and wherein the rim of the indicator diaphragm is supported by the shoulder.

10. The pressure indicator of claim 9, further comprising a ring positioned proximate to the open first end of the coupling body and mechanically connecting the indicator diaphragm to the coupling body.

11. The pressure indicator of claim 7, wherein the predetermined pressure threshold is above atmospheric pressure.

12. A pressure indicator for a static storage container, comprising:
a coupling body having an open first end and an open second end, an inside surface and an outside surface extending from the open first end to the open second end, the inside surface surrounding a first opening and a second opening;

an indicator member positioned adjacent to the first opening and movable from a first position a first distance from the open first end to a second position a second distance from the first end responsive to the open second end of the coupling body being exposed to a pressure within the static storage container above a predetermined pressure threshold, the indicator member being biased to the first position; and, a valve positioned within the second opening.

13. The pressure indicator of claim 12, wherein the static storage container is a plastic or metal drum having at least two bung holes.

14. The pressure indicator of claim 12, wherein the coupling body defines a shoulder extending circumferentially around the coupling body and forming a part of the inside surface adjacent to the first end, and wherein the rim of the indicator diaphragm is supported by the shoulder.

15. The pressure indicator of claim 14, further comprising a ring positioned proximate to the open first end of the coupling body and mechanically connecting the indicator diaphragm to the coupling body.

16. The pressure indicator of claim 12, wherein the predetermined pressure threshold is above atmospheric pressure.

* * * * *